(12) United States Patent
Weidinger

(10) Patent No.: US 6,491,151 B1
(45) Date of Patent: Dec. 10, 2002

(54) FRICTION CLUTCH

(75) Inventor: Reinhold Weidinger, Unterspiesheim (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/651,810

(22) Filed: Aug. 30, 2000

(30) Foreign Application Priority Data

Aug. 30, 1999 (DE) .......................................... 199 41 208

(51) Int. Cl.[7] .......................... F16D 66/02; F16D 13/75
(52) U.S. Cl. ................... 192/70.25; 192/30 W
(58) Field of Search .......................... 192/30 W, 70.25, 192/111 A, 111 B, 111 R; 340/453, 454

(56) References Cited

U.S. PATENT DOCUMENTS

| 4,474,274 A | 10/1984 | Lutz et al. |
| 5,238,093 A | 8/1993 | Campbell |
| 5,320,205 A | 6/1994 | Kummer et al. |
| 5,595,275 A | 1/1997 | Gochenour et al. |
| 5,645,152 A | * 7/1997 | Weidinger ................ 192/70.25 |
| 5,921,365 A | * 7/1999 | Bayer ...................... 192/111 A |
| 6,109,412 A | * 8/2000 | Cole et al. ................ 192/70.25 |
| 6,193,039 B1 | * 2/2001 | Doremus et al. ......... 192/70.25 |
| 6,259,995 B1 | * 7/2001 | Amberger et al. ........ 192/30 W |

FOREIGN PATENT DOCUMENTS

| DE | 26 40 088 | 3/1978 | ........... F16D/66/02 |
| DE | 197 56 451 | 12/1998 | ........... F16D/13/60 |
| GB | 2 088 510 | 6/1982 | ........... F16D/66/02 |
| GB | 2 144 810 | * 3/1985 | |
| JP | 9-222133 | 8/1997 | ........... F16D/13/75 |

* cited by examiner

*Primary Examiner*—Rodney H. Bonck
(74) *Attorney, Agent, or Firm*—Cohen, Pontani, Lieberman & Pavane

(57) ABSTRACT

A friction clutch, in particular for a motor vehicle, has a wear state indicating arrangement for indicating a state of wear of friction linings of the friction clutch.

6 Claims, 8 Drawing Sheets

FRICTION CLUTCH

BACKGROUND OF THE INVENTION

1. Field of the Invention

The present invention is directed to a friction clutch having wear compensation.

2. Description of the Related Art

Wear occurs in friction clutches over the duration of their operating life in the region of friction linings of a clutch disk of the friction clutch. The wear produces a change in the force characteristic of an energy accumulator if the wear is not compensated for, thereby changing the required actuating force over the life of the clutch. The change in required actuating force is especially apparent during manual actuation of the clutch. The occurring wear also requires that the clutch disks be replaced when the friction linings are almost completely worn out but before the linings are completely worn to maximize the life of the clutch lining and prevent damage which may occur when the linings are completely worn.

SUMMARY OF THE INVENTION

It is the object of the present invention to provide a friction clutch and a thrust plate assembly for a friction clutch in which the need to replace a clutch disk is detected early.

According to the present invention, the object is met through a friction clutch including a wear state indicating arrangement.

The wear state indicating arrangement supplies information to the user of the vehicle having this type of friction clutch regarding the status of wear of the clutch or whether or not the clutch disk has reached a replacement state in which it is are required to be replaced by a new clutch disk. The indication makes it possible to avoid operating the vehicle over a long period when the clutch disk is completely worn out, which could lead to damage to other components and, in particular, would result in that the required torque could no longer be transmitted via the clutch.

The friction clutch may, for example, comprise a housing and a pressure plate arranged in the housing and connected with the housing so as to be substantially fixed with respect to rotation relative to it and displaceable in the direction of an axis of rotation relative to the housing. The pressure plate has a friction surface region for contacting a counterfriction surface on a friction lining of a clutch disk or similar element. The wear state indicating arrangement is designed to indicate the wear occurring substantially in the region of friction linings of the clutch disk.

To gather information about the state of wear in a simple manner, the friction clutch according to the invention may comprise at least one element which is displaceable when wear occurs. In this embodiment, the wear state indicating arrangement is designed to indicate wear based on the displacement of the at least one element.

In an arrangement which is especially simple to build, the wear state indicating arrangement may comprise at least one indicating element which is arranged so as to be rotatable at the friction clutch. The at least one indicating element is arranged so that it is set in rotation by the displacement of the at least one element.

A wear state indicating arrangement of this kind continuously indicates the wear state of the clutch.

In one embodiment, the at least one element may comprise a first toothed area in a meshed engagement with a second toothed area provided at the at least one indicating element.

In another embodiment form, the at least one element may have at least one indicating mark which moves when the at least one element is displaced relative to at least one reference mark. Accordingly, the wear state indicating arrangement comprises at least one indicating mark and at least one reference mark. The relative position of the indicating mark and the reference mark indicates the wear state of the friction clutch so that it is possible to continuously track the wear state of a friction clutch and of the clutch disk.

In another embodiment form, the wear state indicating arrangement comprises at least one indicating member which is pretensioned or is pretensionable toward a wear indicating position. In this embodiment, the at least one indicating member moves corresponding to the displacement of the at least one element toward the wear indicating position.

The at least one indicating member may be held by the at least one element in a wear-free indicating position, i.e., a position which indicates that there is no wear, until the at least one element has been displaced into a predetermined position corresponding to when the friction linings are nearly fully worn. When the at least one element is displaced to the predetermined position, the at least one element releases the at least one indicating member and the at least one indicating member is allowed to move to the wear indicating position. In this type of wear state indicating arrangement, the transition of the at least one indicating member from the wear-free indicating position to the wear indicating position indicates that the clutch disk has now entered a wear state that may not yet be critical at the moment, but which requires replacement of the clutch disk as soon as possible.

In a simple embodiment, the at least one indicating member may be pretensioned or pretensionable by centrifugal force in the wear indicating position.

Further, the at least one indicating member may have a first contact area by which the at least one indicating member contacts the at least one element in the wear-free indication position and a second contact area by which the at least one indicating member contacts the at least one element after moving into the wear indicating position.

Since modern friction clutches often employ wear compensation adjustment devices that automatically compensate for occurring wear and that generally contain structural component parts which are displaced in a compulsory manner when wear occurs and when wear compensation is carried out, it is suggested according to another aspect of the present invention that the at least one element is at least a part of a wear compensating adjustment device via which wear is compensated. For example, the at least one element may comprise an adjusting ring which is essentially rotatable about the axis of rotation when wear occurs.

It is especially advantageous to indicate the wear state when using a friction clutch with a wear compensating adjustment device because it would not be known through a changing actuation force that the clutch has reached a critical state. That is, when a clutch comprises a wear compensation device, there is no change in actuation force as the wear progresses. Therefore, the actuation force provides no indication to the user even when the clutch has reached a critical state with respect to wear.

The clutch according to the invention may comprise an energy accumulator supported at a clutch housing on one side and at a pressure plate via the wear compensating adjustment device on the other side.

The present invention is further directed to a thrust plate assembly for a friction clutch according to the invention, wherein the wear state indicating arrangement according to the present invention is provided at the thrust plate assembly.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described in detail in the following with reference to the accompanying drawings showing preferred embodiment forms.

DETAILED DESCRIPTION OF THE PRESENTLY PREFERRED EMBODIMENTS

Figure 1:
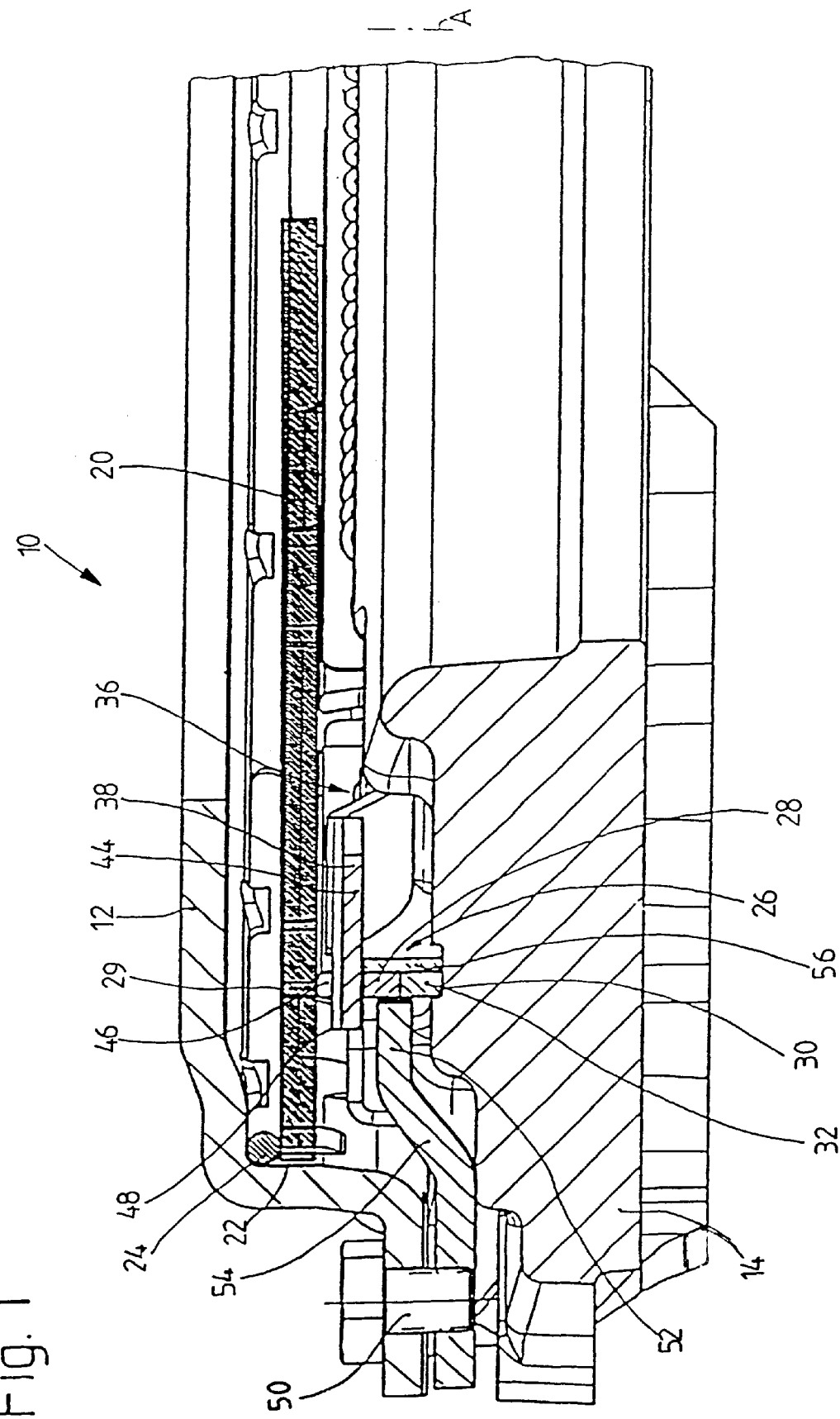
FIG. 1 is a partial longitudinal sectional view of a thrust plate assembly for a friction clutch according to an embodiment of the present invention along line I—I in FIG. 2.
Figure 2:
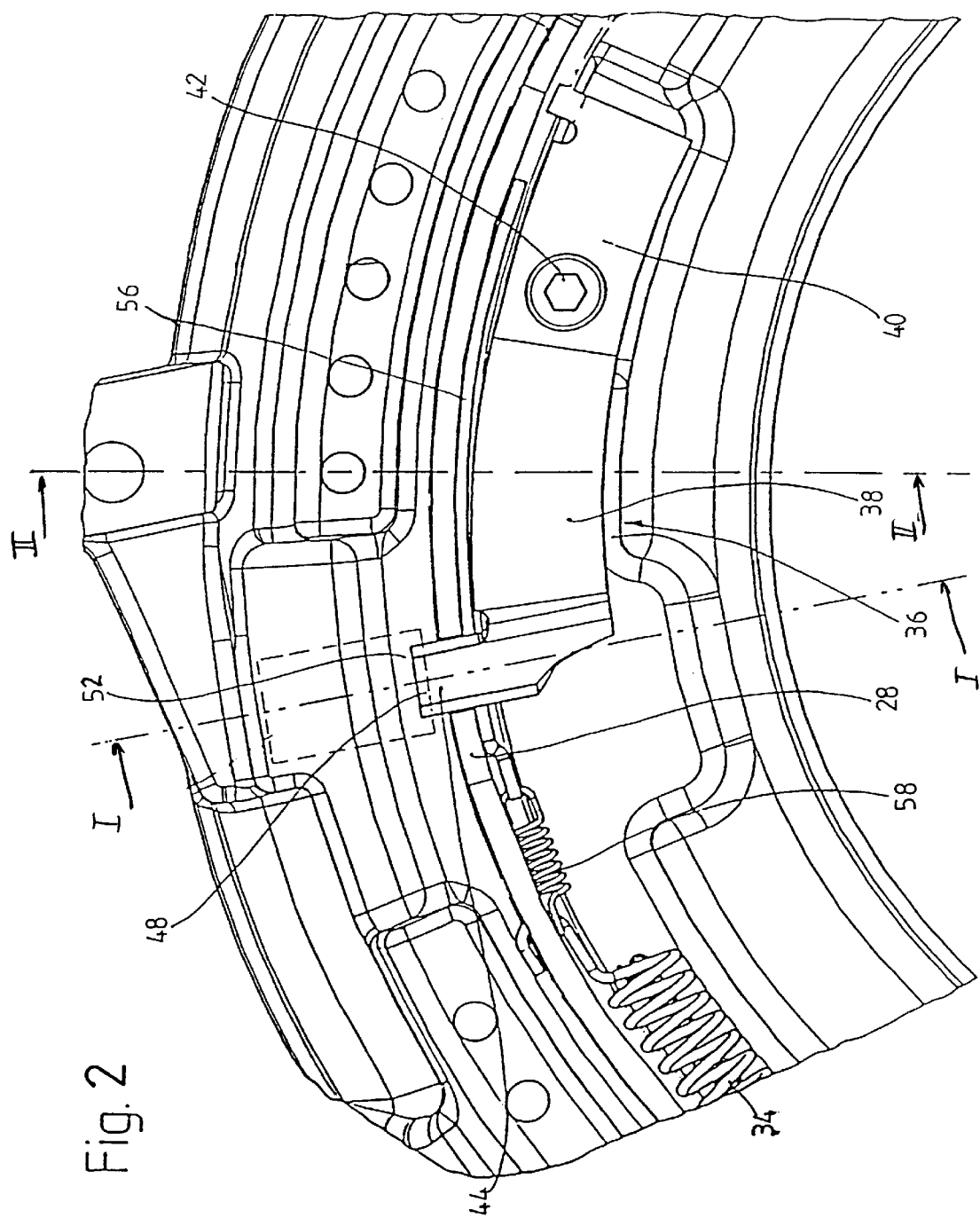
FIG. 2 is an axial view of a circumferential section of the thrust plate assembly of FIG. 1 without a housing.
Figure 3:
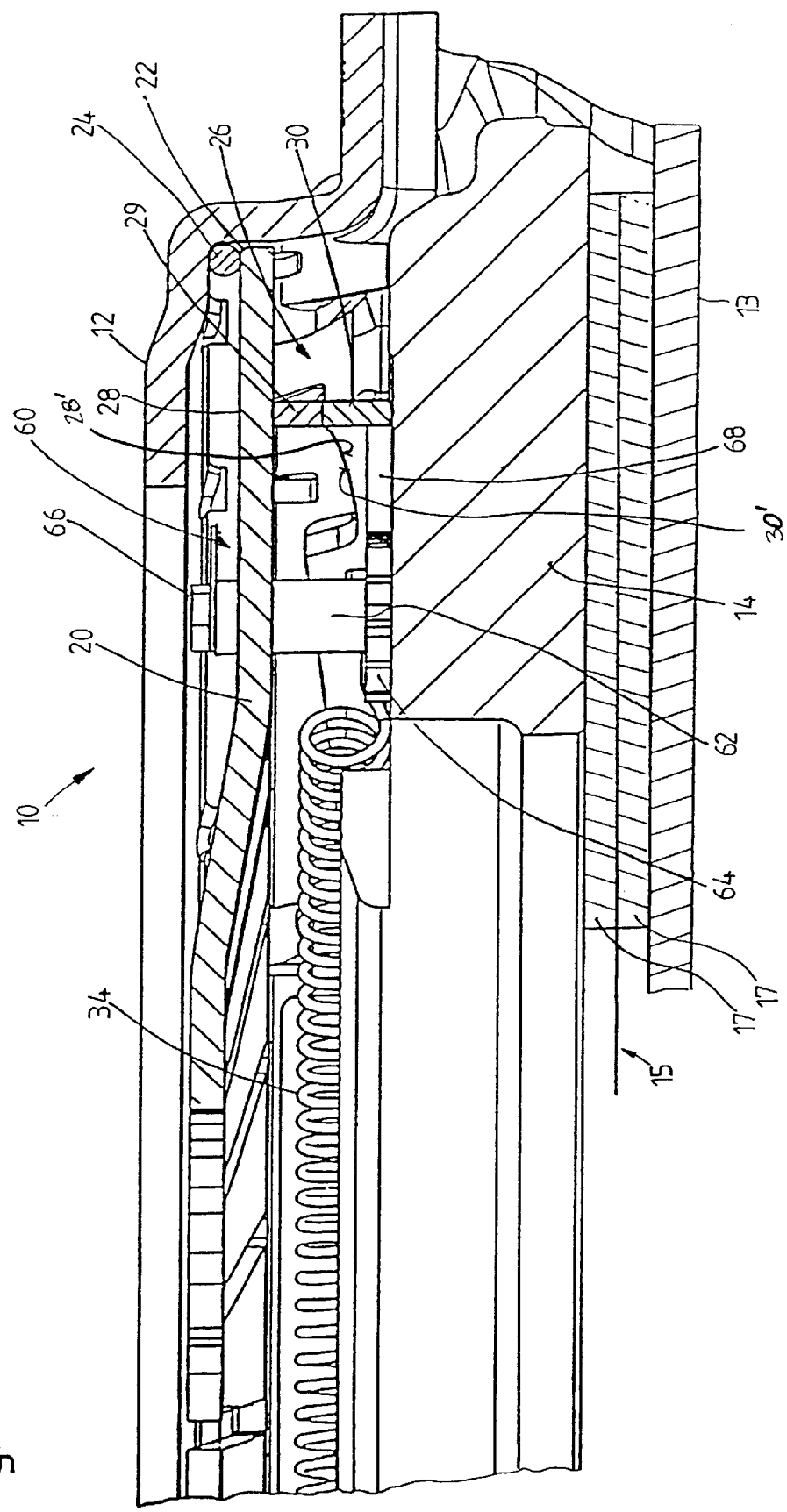
FIG. 3 shows a partial longitudinal sectional view of the thrust plate assembly of FIG. 2 along line III—III.

FIGS. 1–3 show a thrust plate assembly 10 according to an embodiment of the present invention comprises a housing 12 and a pressure plate 14 connected with the housing such as, for example, via a plurality of tangential leaf springs which are arranged so as to be distributed in the circumferential direction and which are fastened to the pressure plate 14 and to the housing 12, for example, by rivet bolts or other mechanical connector. The tangential leaf springs extend approximately in the circumferential direction or tangential to the circumferential direction. The tangential leaf springs form a connection arrangement between the pressure plate 14 with the housing 12 so that the pressure plate 14 is movable with respect to the housing 12 in the direction of an axis of rotation A about which the thrust plate assembly 10 rotates during operation, and fixed with respect to rotation relative to the housing 12 in the circumferential direction. An energy accumulator such as, for example, a diaphragm spring 20 acts between the pressure plate 14 and the housing 12. A supporting area 22 at the radial outer side of the diaphragm spring 20 is supported at the housing 12 via a support ring 24 arranged therebetween. An application area 29 of the diaphragm spring 20 acts on the pressure plate 14 via a wear compensating adjustment device 26. As indicated in FIG. 1, the application area 29 is located radially inside of the supporting area 22 because, in this embodiment form, the thrust plate assembly is provided for mounting a pulled clutch. The housing 12 is connected with a flywheel 13 and a clutch disk 15 with friction linings 17 is arranged between the pressure plate 14 and the flywheel 13 to form a friction clutch (see FIG. 3).

The wear compensating adjustment device 26 comprises first and second adjusting rings 28, 30. The second adjusting ring 30 is supported directly on a recess 32 on the pressure plate 14 and is guided in the recess 32. The first adjusting ring 28 is acted upon by the application area 29 of the diaphragm spring 20. As is shown in FIG. 3, the mutually facing surface regions of the first and second adjusting rings 28, 30 have complementing inclined surfaces 28', 30' arranged such that the complementing inclined surfaces slide along one another when the first adjusting rings 28, 30 rotate relative to one another about the axis of rotation A and change the total axial extension of the adjusting device 26.

The first and second adjusting rings 28, 30 are pretensioned with respect to rotation relative to one another by a pretensioning spring 34 with one side acting on the second adjusting ring 30 and the other side acting on the first adjusting ring 28. The spring 34 pretensions the first and second rings 28, 30 toward movement in a wear compensating adjustment direction, i.e., in a direction in which the first and second rings 28, 30 are rotated relative to one another so that the total axial extension of the adjusting device 26 increases.

The thrust plate assembly 10 further comprises at least one play transmitter arrangement 36 comprising a spring element 38 secured to the pressure plate 14 by a screw 42 or other mechanical connection in a first end region 40 of the spring element 38 which, as can be seen in FIG. 1, extends in the circumferential direction proceeding from this fastening area. A blocking projection 44 extending radially outward from the spring element 38 engages a recess 46 of the adjusting ring 28. In this manner, the adjusting ring 28 is held with respect to the pressure plate 14 so as to be essentially fixed with respect to rotation relative to it. The radial outermost portion 48 of the spring element 38 engages over a stop element 52 which is fastened to the housing 12 via a screw bolt 50 or other mechanical connection. This stop element 52 extends from the fastening area at the housing 12 along a bent area 54 to an area proximate the radial outermost portion 48 of the spring element 38.

FIGS. 1 and 2 further show a wedge-like blocking element 56 which is positioned in the circumferential area into which the projection 44 radially extends. The wedge-like blocking element 56 is pretensioned by a spring 58 toward movement in the circumferential direction. The spring 58 has an end attached to the end of the pretensioning spring 34 connected with the second adjusting ring 30. The wedge-like blocking element 56 is constructed so that its thickness in the axial direction increases proceeding away from the area of the blocking element 56 to which the spring 58 is connected.

The manner of operation of the thrust plate assembly 10 according to the invention and a friction clutch outfitted therewith will be described in the following in relation to compensation of wear. It is noted in this respect that the thrust plate assembly 10 is, for example, fixedly connected to a flywheel in the radial outer area of the housing 12 and a friction clutch with a clutch disk 15 having friction linings 17 is positioned between the flywheel 13 and the pressure plate 14 (see FIG. 3).

When wear occurs during operation of the clutch, for example, during engagement and disengagement, the pressure plate 14 moves toward the flywheel 13 and accordingly away from the housing 12, shown by way of example in FIG. 1, because the friction linings 17 of the clutch disk become thinner. When the movement of the pressure plate 14 becomes so large that the projection 44 of the spring element 38 abuts at the stop 52, the spring element 38 with its projection 44 cannot follow a further movement of the pressure plate 14 toward the flywheel 13. The projection 44 of the spring element 38 is accordingly lifted off the adjusting ring 28 during such further movement of the pressure plate 14. When the projection 44 of the spring element 38 lifts from the adjusting ring 28, the axial distance between the projection 44 and the pressure plate 14 accordingly increases. The increased axial distance allows the wedge-like blocking element 56 to be displaced by the urgency of the spring 58 so that the projection 44 is prevented from moving back toward the pressure plate 14 during a subsequent clutch release process in which this projection 44 moves away from the stop 52 again. Thus, an axial intermediate space initially remains between the projection 44 and the adjusting ring 28.

In the engaged state of a clutch, the adjusting ring 28 is acted upon by the diaphragm spring 20. Accordingly, compensation of wear through rotation of the second adjusting ring 30 which is freely rotatable with respect to the pressure plate 14 is prevented from occurring in this state. When the clutch enters a disengaging process, the diaphragm spring 20 is pulled away from the flywheel 13 in its radial inner area which cancels the application of force by diaphragm spring 20 on the first adjusting ring 28, and therefore by the adjusting device 26. After the diaphragm spring 20 is moved, only a pressing pressure force of the pressure plate 14 in the direction of the diaphragm spring 20 is generated by the tangential leaf springs or the like. However, this pretensioning force is not great enough to prevent the two adjusting rings 28, 30 from executing a relative rotation with respect to one another. This relative rotation continues until the first adjusting ring 28 again abuts against the projection 44 of the spring element 38, so that the wear that has previously taken place is compensated for exactly.

After a clutch disk is completely worn and replaced by a new clutch disk that is not worn, the wear compensating adjustment device 26 must be brought into a position associated with a state in which there is little or no wear of the clutch disk. A restoring arrangement 60 may be provided in the thrust plate assembly 10 according to the present invention as is shown in FIG. 3 for restoring the wear compensating device 26. The restoring arrangement 60 comprises a restoring element 62 rotatably arranged on the pressure plate 14 and comprising a toothed wheel portion 64 and an actuation portion 66 penetrating the diaphragm spring 20. The toothed wheel portion 64 meshes with a circumferentially extending toothed area 68 provided at the second adjusting ring 30. When the actuation portion 66 is rotated, for example, by a wrench or other tool, the toothed portion 64 is simultaneously rotated. The rotation of the toothed wheel portion 64 moves the toothed area 68 in the circumferential direction. The adjusting ring 30 is moved with the toothed area 68 in the circumferential direction opposite to the pretensioning by the pretensioning ring 34, so that the inclined surface regions of the adjusting rings 28, 30 which rest against one another slide along one another and the axial extension of the wear compensating adjustment device 24 is reduced again.

Figure 4:
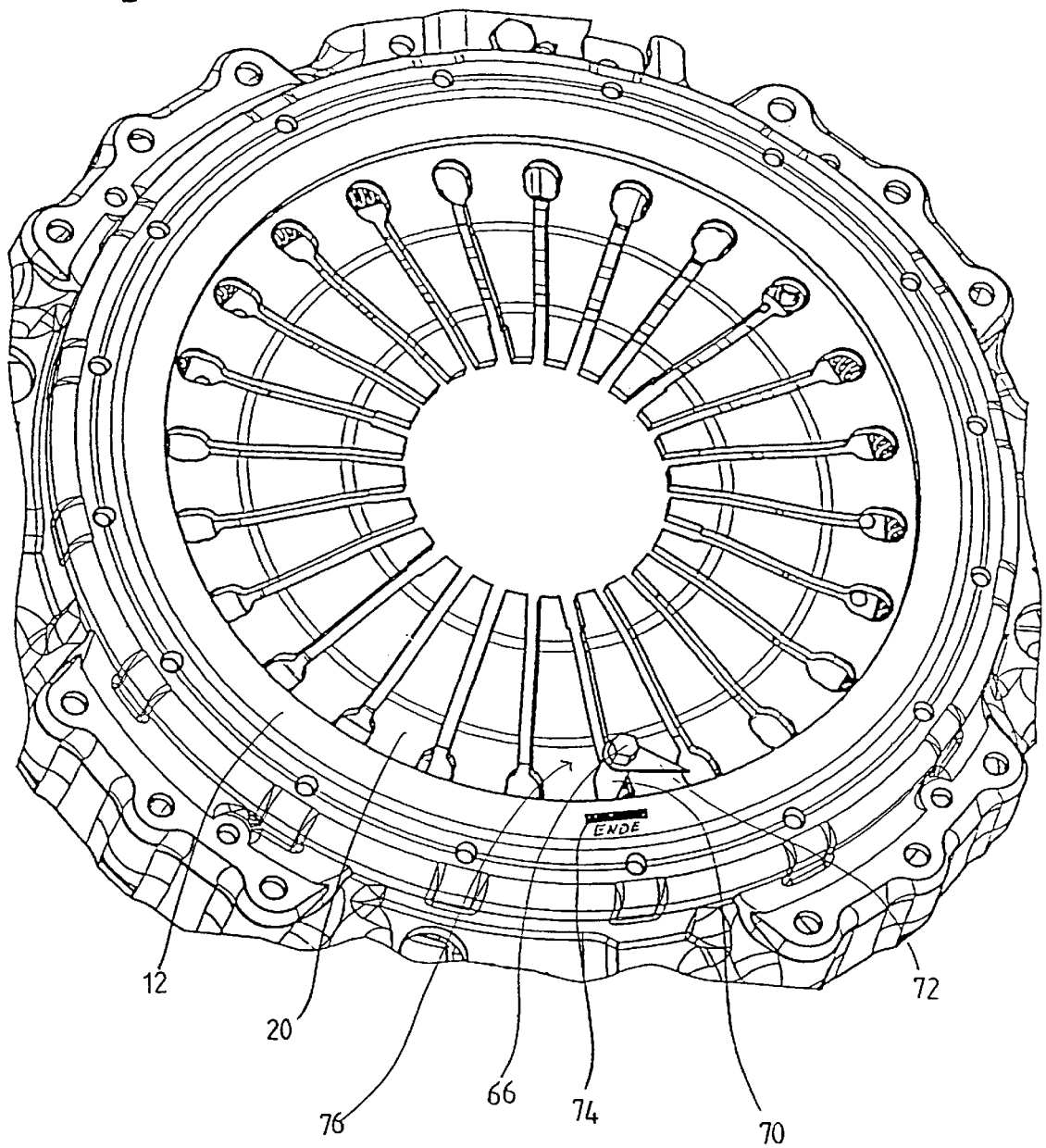
FIG. 4 is a perspective view of the thrust plate assembly of FIGS. 1–3.

FIGS. 3 and 4 show that an indicating element in the form of a pointer 72 is fastened to the portion of a shaft 70 of the restoring element 62 penetrating the diaphragm spring 20 via a screw which comprises a hexagonal screw in the illustrated example. The head 66 of this screw simultaneously forms the actuation part for a tool to bring the wear compensating adjustment device 26 into a state corresponding to a new clutch without wear in the manner described above. The pointer 72 is accordingly also rotated by the rotation of the second adjusting ring 30 occurring during operation and the rotation of the restoring element 62 induced thereby, so that the instantaneous position of the pointer 72 always shows the current state of wear of the clutch. For example, the pointer 72 may point radially inward in the new, wear-free state of the friction linings and gradually move radially outward until it is located over a mark 74 that is provided at the housing 12, the mark 74 indicating that the clutch has reached a state of wear requiring replacement of the clutch disk.

The wear state indicating arrangement 76 comprising the pointer 72 is advantageous especially because wear is compensated in the friction clutch shown in FIGS. 1 to 4 by the wear compensating adjustment device 26 and that the state of wear of the clutch can therefore not be immediately observed.

It is noted that this wear state indicating arrangement 76 need not necessarily also take over the function of a restoring arrangement described above. Rather, it is also possible to provide the restoring arrangement 60, as shown in FIG. 3, as an independent arrangement and to indicate wear at a wear state indicating arrangement 76 which is separate from the restoring arrangement 60 but which can have the same construction as that described with reference to the restoring arrangement 60.

Figure 5:
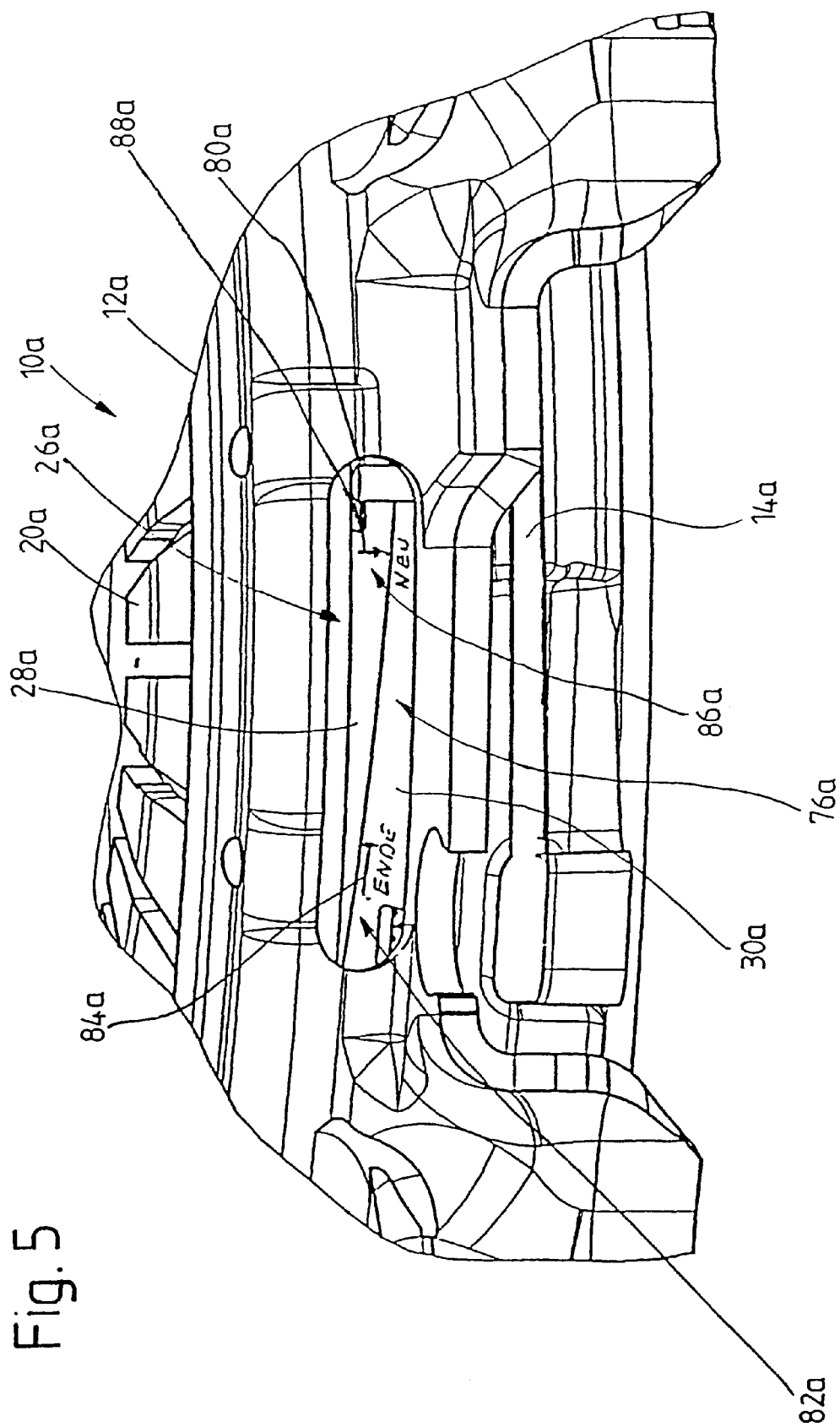
FIG. 5 is a sectional view from the radial outside of an alternative embodiment of a thrust plate assembly according to the present invention from the radial outside.

An alternative embodiment form of a friction clutch or thrust plate assembly according to the present invention is shown in FIG. 5. Components which correspond with respect to construction and function to the components described in the preceding embodiments are designated by the same reference numbers supplemented by the suffix "a". In this embodiment, a circumferentially extending opening 80*a* is provided on a radial outer side of the housing 12*a*. This opening 80*a* allows an outer circumferential surface of the adjusting rings 28*a,* 30*a* of the wear compensating adjustment device 26*a* which rest against one another by their inclined surfaces to be observed. The first adjusting ring 30*a* which is displaced in the circumferential direction when wear occurs carries a mark 82*a,* for example, in the form of a bar 84*a* indicating an end range of the wear state. The adjusting ring 28*a* which is prevented from rotating by the diaphragm spring (not shown in FIG. 5) carries a reference mark 86*a,* for example, in the form of an arrow 88*a* pointing toward the adjusting ring 30*a*. As the adjusting ring 30*a* with its mark 82*a* rotates toward the right with reference to FIG. 5 over the life of operation, the mark 82*a* gradually approaches the reference mark 86*a*. When the arrow 88*a* of reference mark 86*a* enters the area of the bar 84*a* of mark 82*a,* it can be recognized that the clutch is now in a state in which the clutch disk must be exchanged, for example.

It is noted that, of course, the reference mark 86*a* may also be provided at the housing 12*a* or the pressure plate 14*a* or any other component which is displaced relative to the adjusting ring 30*a* when wear occurs.

Figure 6:
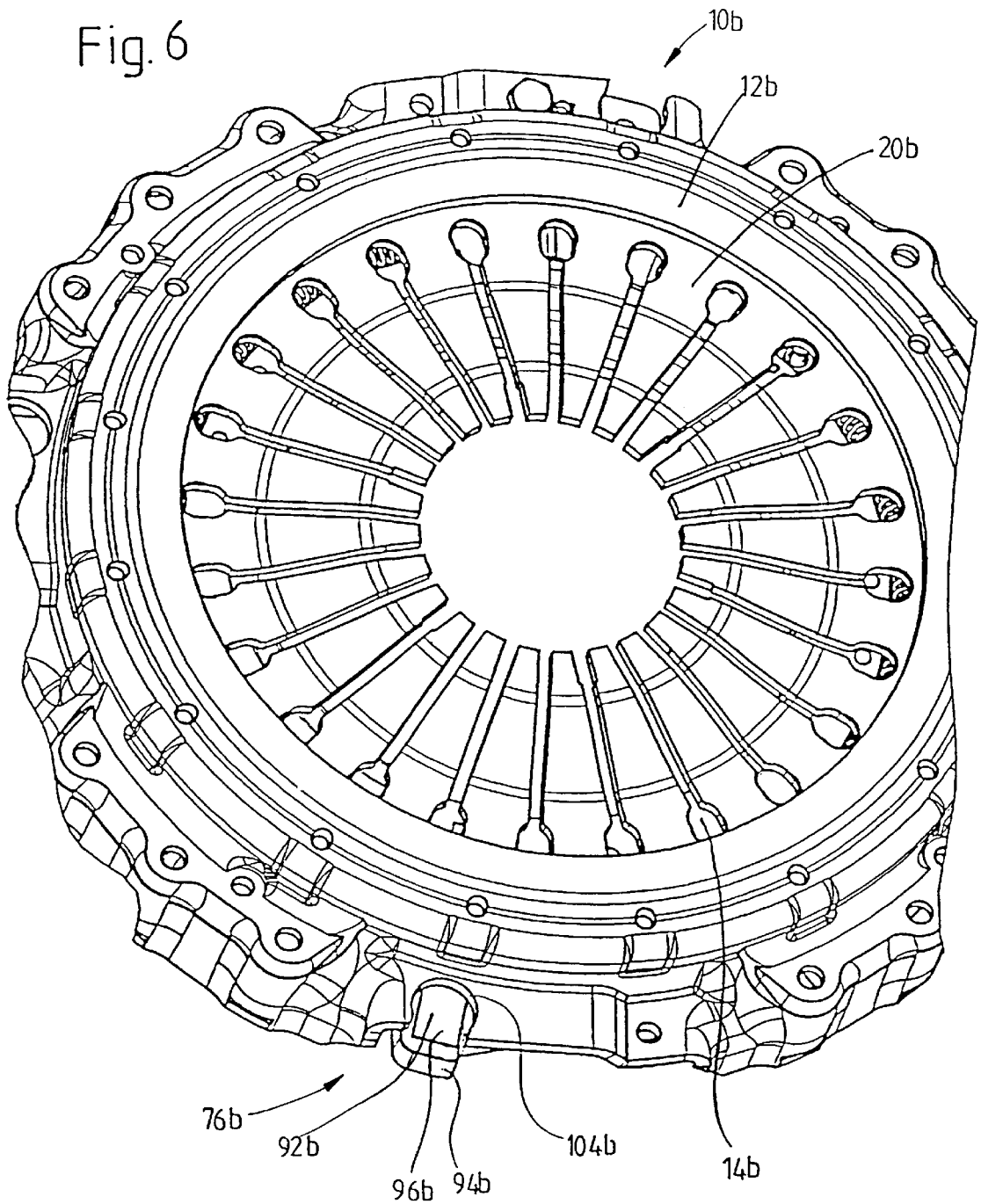
FIG. 6 is a perspective view of yet another embodiment of a thrust plate assembly according to the present invention.
Figure 7:
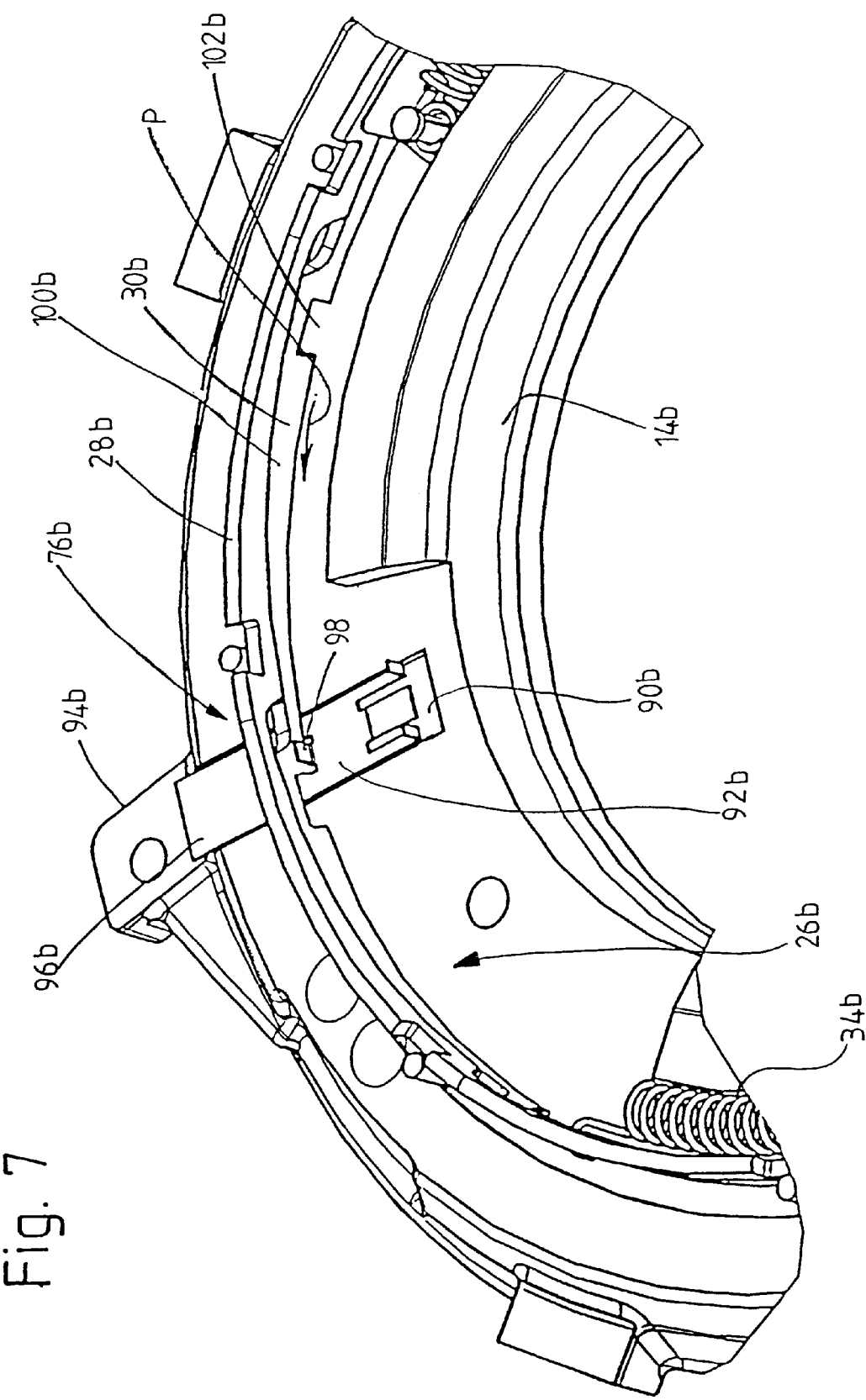
FIG. 7 is a partial perspective view of a portion of the pressure plate of the thrust plate assembly in FIG. 7 in the area of a wear state indicating arrangement.
Figure 8:
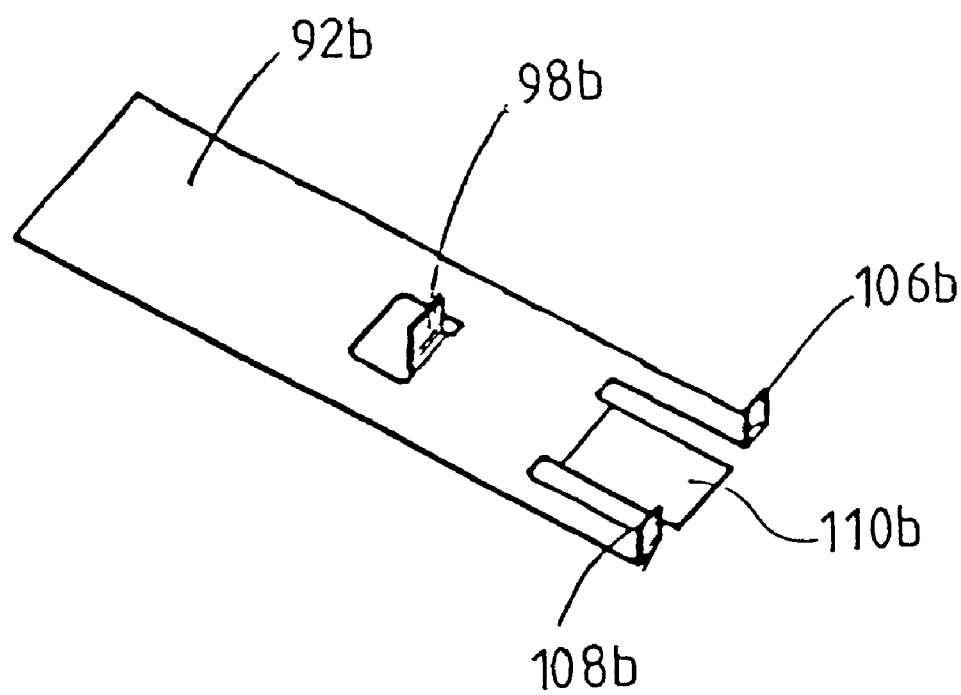
FIG. 8 is a perspective view of an element of the thrust plate assembly shown in FIGS. 6 and 7 which is displaceable for indicating the wear state.

A further embodiment of a friction clutch or thrust plate assembly according to the present invention is shown in FIGS. 6–8. Components which correspond with respect to construction and function to the components described in the preceding embodiments are designated by the same reference numbers supplemented by the suffix "b".

FIG. 7 shows a pressure plate 14b with a recess 90b which extends substantially radially provided in the pressure plate 14b at the side of the latter at which an adjusting ring 30b of a wear compensating adjustment device 26b is supported. A slide 92b is arranged in the recess 90b so that the slide 92b is radially movably guided therein. The recess 90b is aligned with a radial projection 94b of the pressure plate 14b to which, for example, a tangential leaf spring or the like for coupling the pressure plate 14b to the housing 12b is attached. The slide 92b extends radially outward under and through the adjusting ring 30b and terminates with an indicating portion 96b on its radially outer end. The portion of the slide 92b located radially inside of the adjusting rings 28b, 30b has a tongue-like axially bent tab 98b that is bent axially away from the slide 92b and contacts an inner circumferential surface 100b of the adjusting ring 28b in the wear-free indicating position of the wear state indicating arrangement 76b shown in FIG. 7. For this purpose, the slide 92b is preferably made of sheet metal.

When wear occurs in the area of a friction clutch or thrust plate assembly 10b, the adjusting ring 30b moves gradually in the direction of the arrow P in FIG. 7 due to the pretensioning of the spring 34b in the manner described above in the preceding embodiments. When wear has been compensated to the extent that further compensation is essentially impossible and the clutch disk has to be exchanged for continued operation of the clutch, the adjusting ring 30b has moved in the direction of arrow P to the extent that a through-opening or recess 102b provided in this adjusting ring 30b is radially aligned with the tab 98b or overlaps the tab 98b in the circumferential direction. Since the centrifugal force biases the slide 92b radially outward during rotary operation of a friction clutch constructed in this way, the tab 98b, and therefore the slide 92b, is now no longer prevented by the adjusting ring 30b from moving radially outward. Accordingly, after the adjusting ring 30b has rotated in this way out of the wear-free indicating position shown in FIG. 7, it can move into the wear indicating position shown in FIG. 6 in which the indicating end 96b of the slide 92b is visible in a recess 104b of the housing 12b. In this position, the slide 92b is now held at the inner circumferential surface 100b of the adjusting ring 30b by two bends or tabs 106b, 108b provided at its radial inner end of the slide 92b. To prevent the slide 92b from falling back into the wear-free indicating position shown in FIG. 7, for example after the clutch is stopped, this slide 92b has, in addition, an axially bent tab 110b which is supported in the recess 90b of the pressure plate 14b and accordingly secures the slide 92b to the pressure plate 14b radially by friction. However, this friction-type holding allows the slide 92b to be displaced from the radial inside to the radial outside by the effect of centrifugal force. Alternatively or in addition, a pretensioning spring could be arranged between the pressure plate 14b and the slide 92b to pretension the slide radially outward.

It is noted that in the embodiment of FIGS. 6–8 two states may be indicated, e.g., a state in which wear is not yet critical and a state in which wear is critical. However, the adjusting ring 30b may also be constructed such that the inner circumferential surface 100b has an increasingly greater radial distance from the axis of rotation as it approaches the recess 102b, so that the slide 92b can also wander gradually toward the radial outside with the tab 98b contacting the inner circumferential surface 100b, thereby continuously providing a wear state of the friction linings.

It is also noted that in all of the embodiment forms of a friction clutch or thrust plate assembly with wear compensation which were described with reference to FIGS. 3 to 8, the wear compensating adjustment device need not necessarily include the ring elements 28, 30 as shown. Alternatively, the wear compensating adjustment device may include only one individual ring element whose displacement can also show the state of wear. Wedge-shaped slides may also be provided, wherein these wedge-shaped slides then assume the function of the rings for carrying out wear compensation and cooperate with the different organs for wear indication and can have marks. Furthermore, the function of the wear detection device and the construction of the play transmitter may be provided in a variety of ways.

Within the meaning of the present invention, the wear state indicating arrangement may also comprises an arrangement which, for example, supplies information through electrical contact or optical scanning which allows occurring wear to be indicated or observed. This information can then be processed in an evaluating device and utilized for optical and/or acoustic notification of the state of wear.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A friction clutch for a motor vehicle, comprising a friction surface region of a first element for contacting a counter-friction surface region of a second element and a wear state indicating arrangement operatively arranged for indicating a state of wear of at least one of said friction surface region and said counter-friction surface region, a housing rotatable about an axis of rotation, a pressure plate arranged in said housing and connected with said housing so that said pressure plate is fixed with respect to rotation relative to said housing and axially displaceable along the axis of rotation relative to said housing, a clutch disk having friction linings, wherein said pressure plate comprises said first rotatable element and said clutch disk comprises said second rotatable element, said wear state indicating arrangement operatively arranged for indicating the wear occurring in the region of said friction linings, and a displaceable element displaceable in response to wear of said friction linings, wherein said wear state indicating arrangement indicates wear in response to a displacement of said element, wherein said wear state indicating arrangement comprises an indicating member arranged for moving in response to a displacement of said displaceable element, said indicating member held by said displaceable element in a wear-free indicating position until said displaceable element is displaced to a friction lining replacement position, wherein said displaceable element is operatively arranged for allowing said indicating member to move into the wear indicating position when said displaceable element is in said friction lining replacement position and said friction lining replacement position is proximate said fully worn position of said friction linings, and wherein said indicating member is pretensionable via a centrifugal force toward a wear indicating position which indicates the need to replace said friction linings.

2. A friction clutch for a motor vehicle, comprising a friction surface region of a first element for contacting a counter-friction surface region of a second element and a wear state indicating arrangement operatively arranged for indicating a state of wear of at least one of said friction surface region and said counter-friction surface region, a housing rotatable about an axis of rotation, a pressure plate arranged in said housing and connected with said housing so that said pressure plate is fixed with respect to rotation relative to said housing and axially displaceable along the axis of rotation relative to said housing, a clutch disk having friction linings, wherein said pressure plate comprises said first rotatable element and said clutch disk comprises said second rotatable element, and wherein said wear state indicating arrangement is operatively arranged for indicating the wear occurring in the region of said friction linings, and a displaceable element displaceable in response to wear of said friction linings, wherein said wear state indicating arrangement indicates wear in response to a displacement of said element, wherein said wear state indicating arrangement comprises an indicating member arranged for moving in response to a displacement of said displaceable element, said indicating member being one of pretensioned or pretensionable to a wear indicating position which indicates the need to replace said friction linings, wherein said indicating member is held by said displaceable element in a wear-free indicating position until said displaceable element is displaced to a friction lining replacement position, wherein said displaceable element is operatively arranged for allowing said indicating member to move into the wear indicating position when said displaceable element is in said friction lining replacement position and said friction lining replacement position is proximate said fully worn position of said friction linings, and wherein said indicating member comprises a first contact area that contacts said displaceable element in the wear-free indication position and a second contact area that contacts the displaceable element in the wear indicating position.

3. A friction clutch for a motor vehicle, comprising a friction surface region of a first element for contacting a counter-friction surface region of a second element and a wear state indicating arrangement operatively arranged for indicating a state of wear of at least one of said friction surface region and said counter-friction surface region, a housing rotatable about an axis of rotation, a pressure plate arranged in said housing and connected with said housing so that said pressure plate is fixed with respect to rotation relative to said housing and axially displaceable along the axis of rotation relative to said housing, a clutch disk having friction linings, wherein said pressure plate comprises said first rotatable element and said clutch disk comprises said second rotatable element, and wherein said wear state indicating arrangement is operatively arranged for indicating the wear occurring in the region of said friction linings, and a displaceable element displaceable in response to wear of said friction linings, wherein said wear state indicating arrangement indicates wear in response to a displacement of said element, wherein said wear state indicating arrangement comprises an indicating mark arranged on said displaceable element and a reference mark, wherein said indicating mark is displaced relative to said reference mark when said displaceable element is displaced in response to wear, a wear compensating adjustment device operatively arranged for compensating for wear of said friction linings, wherein said displacement element comprises at least a part of said wear compensating adjustment device, and an energy accumulator supported between said clutch housing and said pressure plate, wherein said wear compensating adjustment device is arranged between said pressure plate and said energy accumulator such that said energy accumulator is supported on said pressure plate via said wear compensating adjustment device.

4. The friction clutch of claim 3, wherein said wear compensating adjustment device comprises an adjusting ring rotatable about the axis of rotation in response to wear and wherein said displaceable element comprises said adjusting ring.

5. A thrust plate assembly for a friction clutch comprising a housing rotatable about an axis of rotation, a pressure plate arranged in said housing and connected with said housing so that said pressure plate is fixed with respect to rotation relative to said housing and axially displaceable along the axis of rotation relative to said housing, said pressure plate having a friction surface being arrangeable against a clutch disk of a friction clutch in an engaged state of said thrust plate assembly, a wear state indicating arrangement operatively arranged for indicating a state of wear of the clutch disk on which said pressure plate is arrangeable, and a displaceable element displaceable in response to wear of the clutch disk on which said pressure plate is arrangeable, wherein said wear state indicating arrangement indicates wear in response to a displacement of said element, wherein said wear state indicating arrangement comprises an indicating mark arranged on said displaceable element and a reference mark, wherein said indicating mark is displaced relative to said reference mark when said displaceable element is displaced in response to wear, a wear compensating adjustment device operatively arranged for compensating for wear of the clutch disk on which said pressure plate is arrangeable, wherein said displaceable element comprises at least a part of said wear compensating adjustment device, and an energy accumulator supported between said clutch housing and said pressure plate, wherein said wear compensating adjustment device is arranged between said pressure plate and said energy accumulator such that said energy accumulator is supported on said pressure plate via said wear compensating adjustment device.

6. The thrust plate assembly of claim 5, wherein said wear compensating adjustment device comprises an adjusting ring rotatable about the axis of rotation in response to wear and wherein said displaceable element comprises said adjusting ring.

* * * * *